United States Patent [19]
Ikemoto

[11] Patent Number: 6,129,571
[45] Date of Patent: Oct. 10, 2000

[54] IC CARD CONNECTOR

[75] Inventor: Shinichi Ikemoto, Tokyo, Japan

[73] Assignee: Kel Corporation, Tokyo, Japan

[21] Appl. No.: 09/448,092

[22] Filed: Nov. 23, 1999

[30]     Foreign Application Priority Data

Nov. 27, 1998 [JP] Japan .................................. 10-336727

[51] Int. Cl.[7] ................................................. H01R 13/15
[52] U.S. Cl. .......................... 439/260; 439/862; 439/630
[58] Field of Search ..................................... 439/260, 862, 439/630, 60

[56]            References Cited

U.S. PATENT DOCUMENTS

5,051,566   9/1991   Pernet ..................................... 235/441

*Primary Examiner*—Paula Bradley
*Assistant Examiner*—Tho D. Ta
*Attorney, Agent, or Firm*—Robert W. J. Usher

[57]         ABSTRACT

Each contact 40 comprises an anchoring portion 41, a connect portion 43, and a V-shaped arm portion 44, which further includes first and second arm portions 46 and 47 extending from a pivot portion 45. The pivot portion 45 of each contact engages with the connector housing 32*d* and its movement downward is restricted. A contact portion 48 which is provided at the end of the first arm portion is positioned below the card receiving compartment 13 of the connector while a push portion 47*a* which is provided at the end of the second arm portion is positioned in the card receiving compartment 13. When an IC card 2 is inserted into the card receiving room 13, the tip 2*a* of the IC card hits and lowers the push portions 47*a* of the contacts, thereby rocking the V-shaped arm portion 44 of each contact around the pivot portion 45. As a result, the contact portions 48 of the contacts are lifted and brought into contact with the flat contacts of the IC card 2. With this construction, the distance which the flat contacts of the IC card travel sliding on the contact portions of the contacts of the connector is minimized to reduce the wear of the contacts so as to prevent occurrence of contact failure.

7 Claims, 11 Drawing Sheets

IC CARD CONNECTOR

FIELD OF THE INVENTION

The present invention relates generally to an IC card connector which releasably receives a card-type information storage medium, for example, a PC card, a memory card, and an IC card (any such item will be hereinbelow referred to as "IC card").

BACKGROUND OF THE INVENTION

Use of IC cards has become popular nowadays, and various types of insertable and removable IC cards are used. For example, an insert and connect type connector has been commonly used. In this connector design, female contacts are provided on an IC card at one end thereof while male contacts (or pins), which engage with these female contacts, are provided in the connector. When the IC card is inserted into the connector, the contacts of the IC card come into electrical contact with the contacts of the connector. Another example is a contact and connect type connector. In this connector design, a plurality of flat contacts are provided on a surface of the IC card while a plurality of corresponding contacts are provided in the connector. When the IC card is inserted into a card receiving compartment provided in the connector, the flat contacts come into contact with these contacts of the connector.

Such a contact and connect type connector is disclosed in U.S. Pat. No. 5,051,566. This connector comprises a plurality of contacts, a retaining member and a releasing member. Each of the contacts is provided in cantilever, extending in parallel to the direction of the insertion of an IC card, such that the contact portion of each contact is positioned in the cavity which is provided for reception of an IC card. The retaining member is to retain the contacts in such a condition that the contacts are elastically bent and their contact portions are positioned out of the card receiving compartment. The releasing member is to release the contacts which are held by the retaining member. This releasing action is activated by the contact and push of the front end of an IC card which is inserted into the card receiving compartment. In this construction, as long as an IC card is not in the card receiving compartment, the contacts are retained elastically bent by the retaining member, so that the contact portions are not in the card receiving compartment. However, when the IC card is inserted into the card receiving compartment, the releasing member is operated to release the contacts from the retaining member. When the contacts are released, the contact portions of the contacts return into the card receiving compartment because of the resiliency of each contact and come into contact with the flat contacts of the IC card. In this connector arrangement, the timing when the contact portions meet the flat contacts is controlled to minimize the distance one contact portion travels with respect to the other in sliding contact, thereby reducing the abrasion of both the contact members.

However, this type of conventional connector has an inherent disadvantage of having a number of parts, which results in a high production cost. The electrical contacts, the member to retain these contacts in elastic deformation, and the member to release the contacts from the retaining member, all of which are described above, are all separate components in the connector.

SUMMARY OF THE INVENTION

It is an object of the present invention to minimize the distance which the contact portions of the contacts of the connector slide over the flat contacts of the IC card in contact so as to reduce the abrasion of these contacts for preventing occurrence of contact failure.

It is another object of the present invention to provided an IC card connector which has a relatively small number of parts so as to promote cost reduction.

An IC card connector according to the present invention comprises a plate-like connector housing and a plurality of contacts. The connector housing includes a card receiving compartment, into which an IC card is inserted through a card insertion slot provided at the front end of the connector housing. The contacts are incorporated in the connector housing and are brought into contact with the flat contacts which are provided on the lower surface of the IC card for information interchange. Each of the contacts comprises an anchoring portion, a connect portion, and a V-shaped arm portion. The anchoring portion is fixed in the connector housing at a position below the card receiving compartment, and the connect portion is continuous from the anchoring portion. The V-shaped arm portion is continuous from the connect portion and includes a first arm portion which extends obliquely forward and upward from a pivot portion located centrally in the V-shaped arm portion and a second arm portion which extends obliquely rearward and upward from the pivot portion. In the connector, the pivot portion of the V-shaped arm portion of each contact engages with the connector housing, so the downward movement of the pivot portion is restricted. Furthermore, a contact portion which is provided at the end of the first arm portion is positioned below the card receiving compartment while a push portion which is provided at the end of the second arm portion is positioned in the card receiving compartment. Therefore, when the IC card is inserted through the card insertion slot, a tip of the IC card hits and pushes the push portions of the contacts downward, thereby rocking the V-shaped arm portions of the contacts around the pivot portions. As a result, the contact portions of the contacts are lifted upward and brought into contact with the flat contacts of the IC card.

In this IC card connector, the tip of the IC card pushes downward the push portions of the V-shaped arm portions of the contacts when the IC card is inserted into the receiving compartment, and the resulting rocking action of the V-shaped arm portions around the pivot portions lifts the contact portions, thereby bringing the contact portions of the contacts of the connector into electrical connection with the flat contacts of the IC card. In this design of the IC card connector, the dimensions of the V-shaped arm portions can be determined appropriately to adjust the timing when the contact portions of the contacts of the connector are brought into contact with the flat contacts of the IC card. In this way, the distance which the flat contacts travel sliding on the contact portions of the connector can be minimized to reduce the wear of these contact members, thereby preventing occurrence of contact failure. Therefore, it is preferable that the contact portions of the connector be brought into contact with the flat contacts of the IC card just before the completion of the insertion of the IC card into the card receiving compartment. Furthermore, in this construction, each contact portion and a corresponding push portion, which works to lift or lower the contact portion, are provided in a single body as one component, respectively, not in two separate components. The number of parts used for the assembly of the connector is relatively small, so the production cost of the connector can be effectively reduced. Moreover, in the prior-art connector of the above mentioned U.S. Pat. No. 5,051,566, the contacts are retained in elastic deformation even while no IC card is inserted. Because of this, the prior-art connector may lose reliability in the secure electrical contact between the contact portions of the connector and the flat contacts of the IC card after a long period of use. The IC card connector of the present invention solves this problem because the contacts are released from elastic deformation while no IC card is set in the card receiving room.

In the IC card connector according to the present invention, the connect portion of each of the contacts extends from the anchoring portion obliquely forward and upward continuously to the contact portion, or at first extends from the anchoring portion rearward and then makes a U turn and extends obliquely forward and upward continuously to the contact portion. This design is advantageous in manufacturing because the whole contacts can be formed from one sheet of plate. Furthermore, the contacts of the connector comprise a plurality of first contacts and a plurality of second contacts. In this case, the connect portion of each of the first contacts extends from the anchoring portion obliquely forward and upward continuously to the contact portion, and the connect portion of each of the second contacts extends from the anchoring portion rearward and then makes a U turn and then extends obliquely forward and upward continuously to the contact portion. In the IC card connector, the anchoring portion and the contact portion of each second contact are placed in front of the anchoring portion and the contact portion of a corresponding first contact, and because the first arm portion of each second contact is bent laterally, the second arm portions of the first contacts and the second arm portions of the second contacts are positioned laterally interchangeably in parallel with each other, extending longitudinally. In this way, the contact portion of each first contact is aligned with the contact portion of a corresponding second contact in the longitudinal direction while the push portions of the first and second contacts are aligned in the lateral direction.

In the IC card connector of the present invention, the tip of the IC card is sandwiched between the push portions of the contacts and the connector housing when the IC card is set in the card receiving compartment. This design is preferable because the IC card is retained securely in the card receiving compartment. As a result, the reliability of electrical connection between the contact portions of the connector and the flat contacts of the IC card is relatively high. Therefore, there is no need to provide a special or extra component for the purpose of retaining the IC card in the card receiving compartment. This is an advantage in cost reduction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
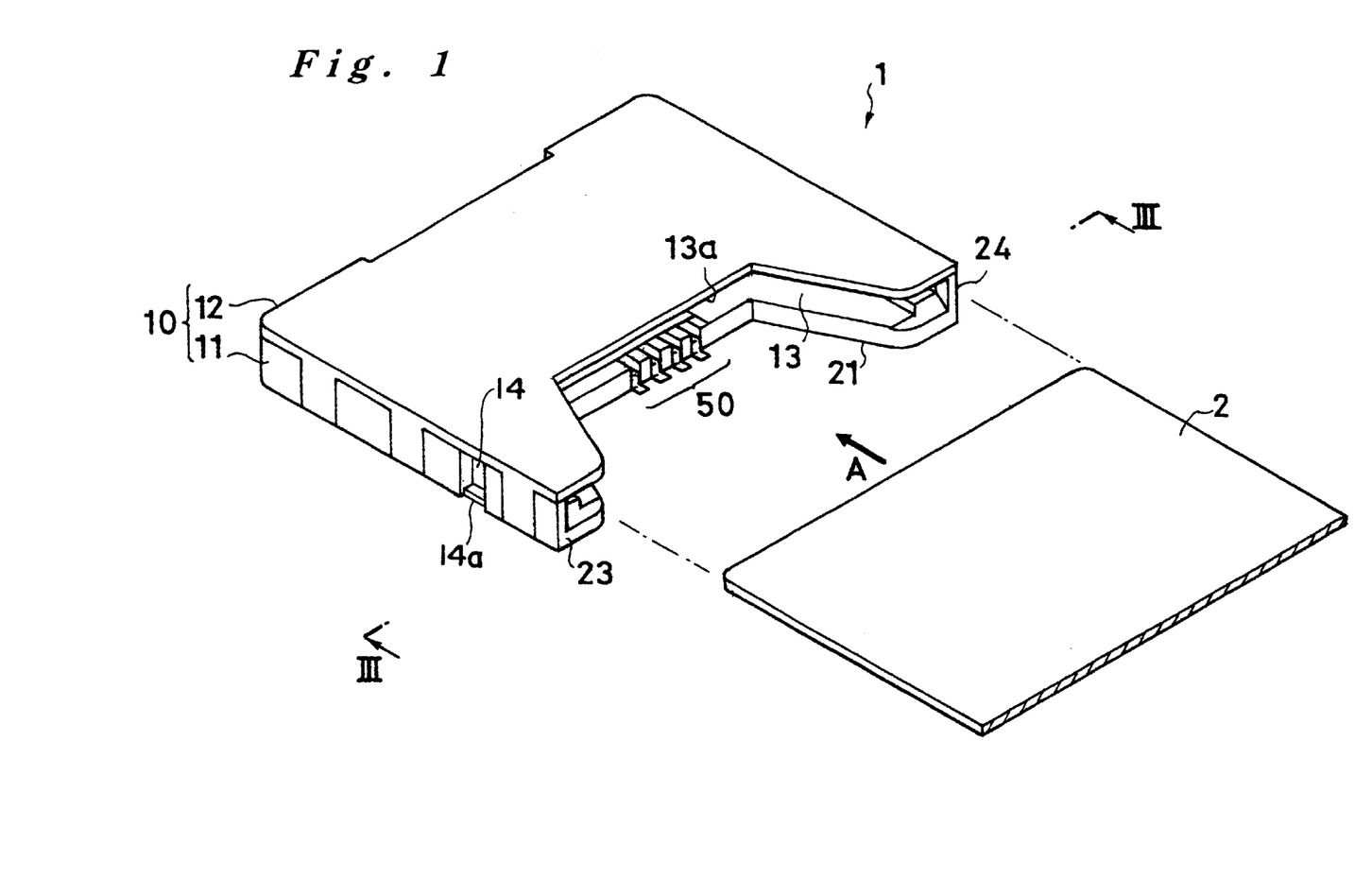
FIG. 1 is a perspective view of an IC card and an IC card connector according to the present invention.

FIG. 1 shows an IC card 2 and an IC card connector (hereinafter referred to as "connector") 1, which receives and releasably maintains this IC card 2. The IC card 2 incorporates an IC chip, in which various kinds of information is recorded, and a plurality of flat contacts (not shown) on the rear surface of the IC card 2. When the IC card 2 is inserted through the slot 13a into the card receiving compartment 13 of the connector 1 in the direction indicated by arrow A, the flat contacts of the IC card 2 come into contact with the contacts of the connector 1 (i.e., the first and second contacts described below), thereby establishing a condition for data transmission. To clarify the following description, the direction indicated by arrow A is hereinafter referred to as "longitudinal direction" (the side of the root of the arrow is defined as "front side"), the direction of the width of the IC card 2 is hereinafter referred to as "lateral direction" (and the left hand side, in facing the connector 1 from the IC card 2, is defined as "left side"), and the direction of the thickness of the connector 1 is hereinafter referred to as "up and down direction".

Figure 2:
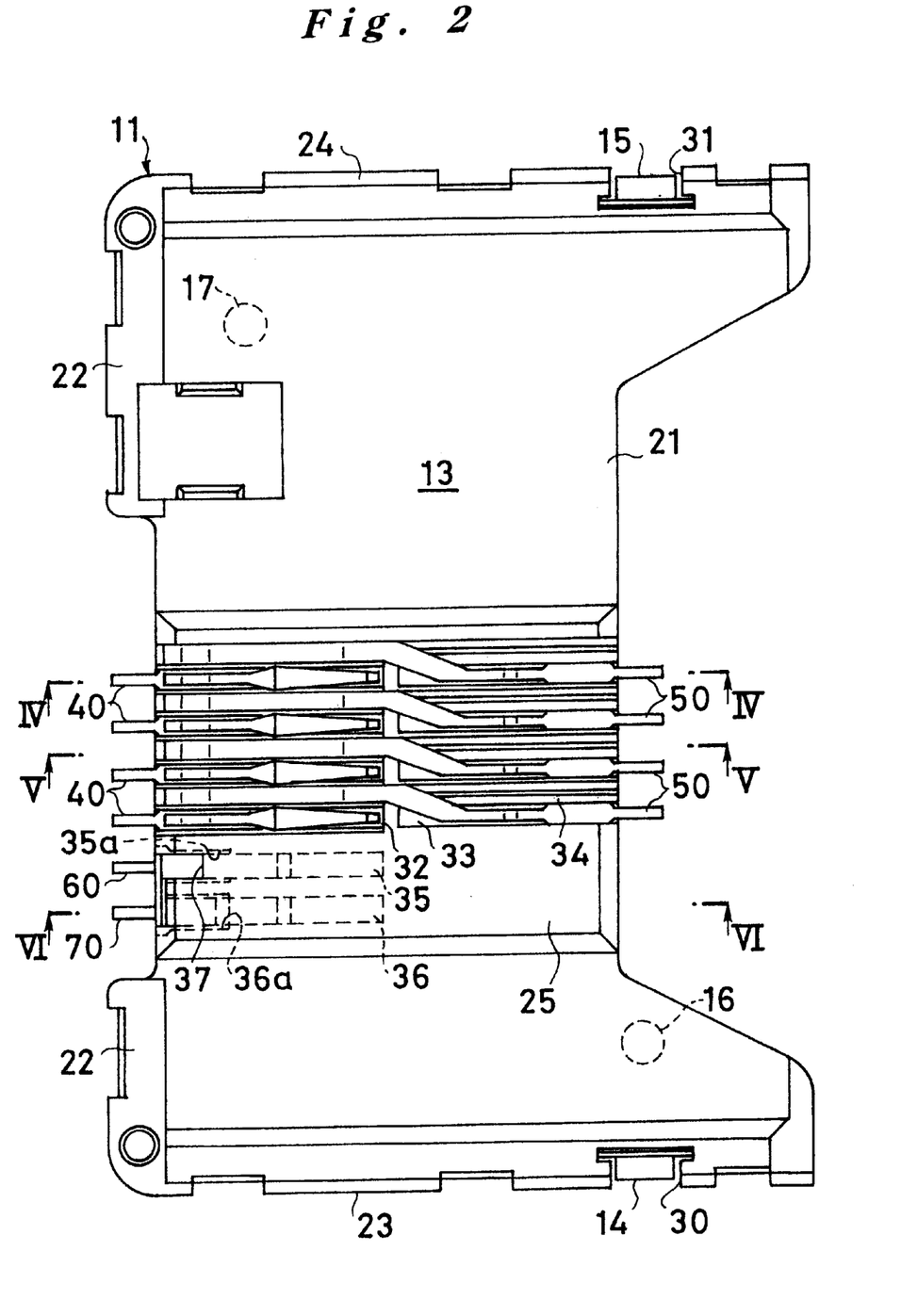
FIG. 2 is a plan view of the IC card connector without a housing cover.

As shown in FIGS. 1 and 2, the connector 1 comprises a connector housing 10, which is made of an electrically insulative resin, a plurality of first contacts 40 and a plurality of second contacts 50, which are made of an electrically conductive material, and first and second switch members 60 and 70, which are also made of an electrically conductive material. These contacts and the switch members are disposed in the connector housing 10.

Furthermore, the connector housing 10 comprises a main housing 11 and a housing cover 12, which is mounted on the main housing 11. As shown in FIG. 2, the main housing 11 comprises a bottom wall 21, a rear wall 22, which stands upward at the rear end of the bottom wall 21, and lateral side walls 23 and 24, which stand upward at the lateral ends of the bottom wall 21. The bottom wall 21, the rear wall 22 and the side walls 23 and 24 of the main housing 11 together with the housing cover 12 define the card receiving compartment 13 with the slot 13a, which opens forward (there is an opening also at the central part of the rear wall 22).

Figure 3:
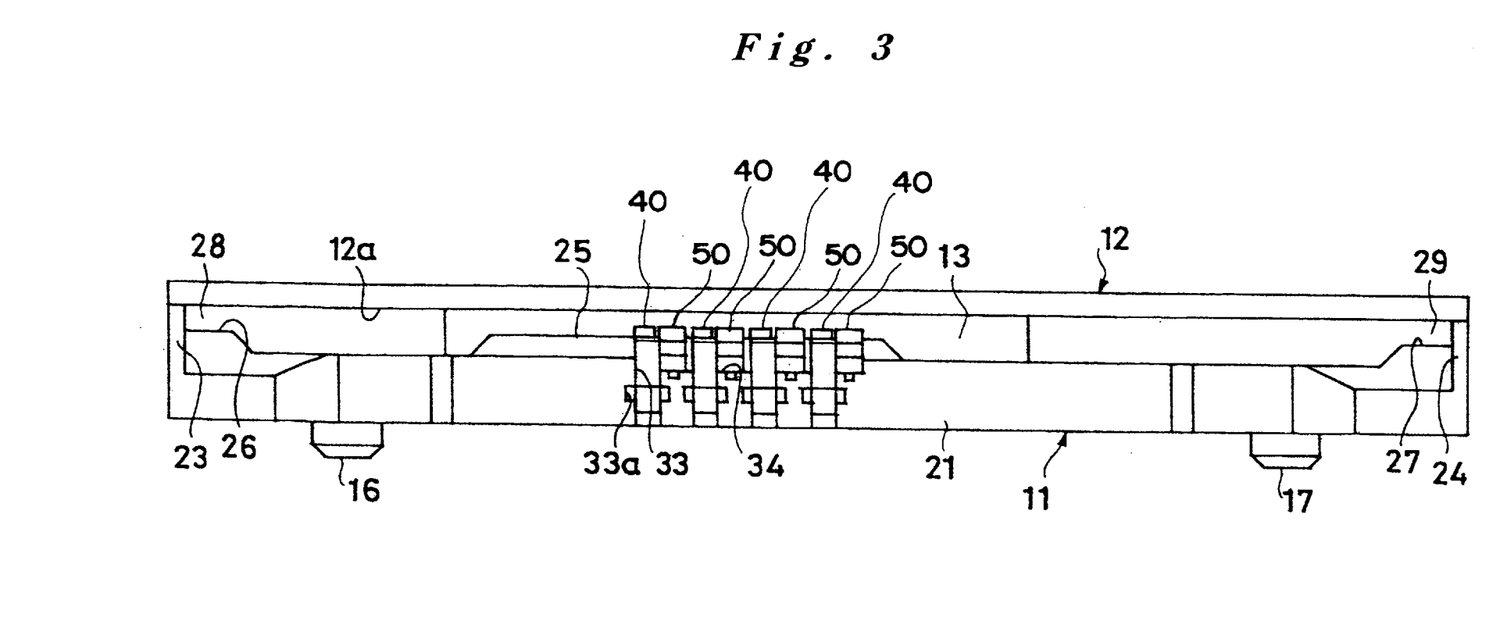
FIG. 3 is a front view of the IC card connector, taken along line III—III FIG. 1.

As shown in FIG. 3, the main housing 11 further includes a central stage 25 and lateral side stages 26 and 27, which rise upward near the center and at the lateral sides of the bottom wall 21 inside the side walls 23 and 24, respectively. The upper surfaces of these stages are prepared to maintain a predetermined distance to the lower surface 12a of the housing cover 12. The IC card 2 is inserted in to the space defined by the upper surfaces of the side stages 26 and 27 and the lower surface of the housing cover 12 inside the card receiving compartment 13, so the upper surface of each side stage 26 or 27 and the lower surface 12a of the housing cover 12 forms a guide groove 28 or 29, respectively, for smooth insertion of the IC card 2. Furthermore, metal fitting anchoring slots 30 and 31, which extend upward, are provided in the lateral side walls 23 and 24, respectively, and metal fittings 14 and 15 are fixed in the metal fitting anchoring slots 30 and 31, respectively. Moreover, on the lower surface of the bottom wall 21, two positioning pins 16 and 17 are provided protruding downward, one at a front and left location and the other at a rear and right location on the bottom wall. The metal fittings 14 and 15 and the positioning pins 16 and 17 are used to position and fix the connector 1 onto a printed circuit board (which will be described later).

As shown in FIG. 2, four first grooves 32, in which four first contacts 40 are mounted, four second grooves 33, in which four second contacts 50 are mounted, and four third grooves 34 are provided in parallel with one another in the central stage 25, each extending in the longitudinal direction. The first grooves 32 are positioned in the rear half of the central stage 25 while the second grooves 33 are positioned in the front half of the central stage 25. The center line of each of the first grooves 32 is aligned with that of a corresponding second groove 33 in the longitudinal direction, and each of the third grooves 34 is aligned on the right side (the upper side in FIG. 2) of corresponding first and second grooves 32 and 33 which are aligned in a line in the longitudinal direction. Furthermore, first and second compartment 35 and 36 are provided extending in the longitudinal direction in the rear left part of the bottom wall under the central stage 25. The first and second compartment 35 and 36 are used for incorporating the first and second switch members 60 and 70 in the central stage portion of the bottom wall.

Figure 4:
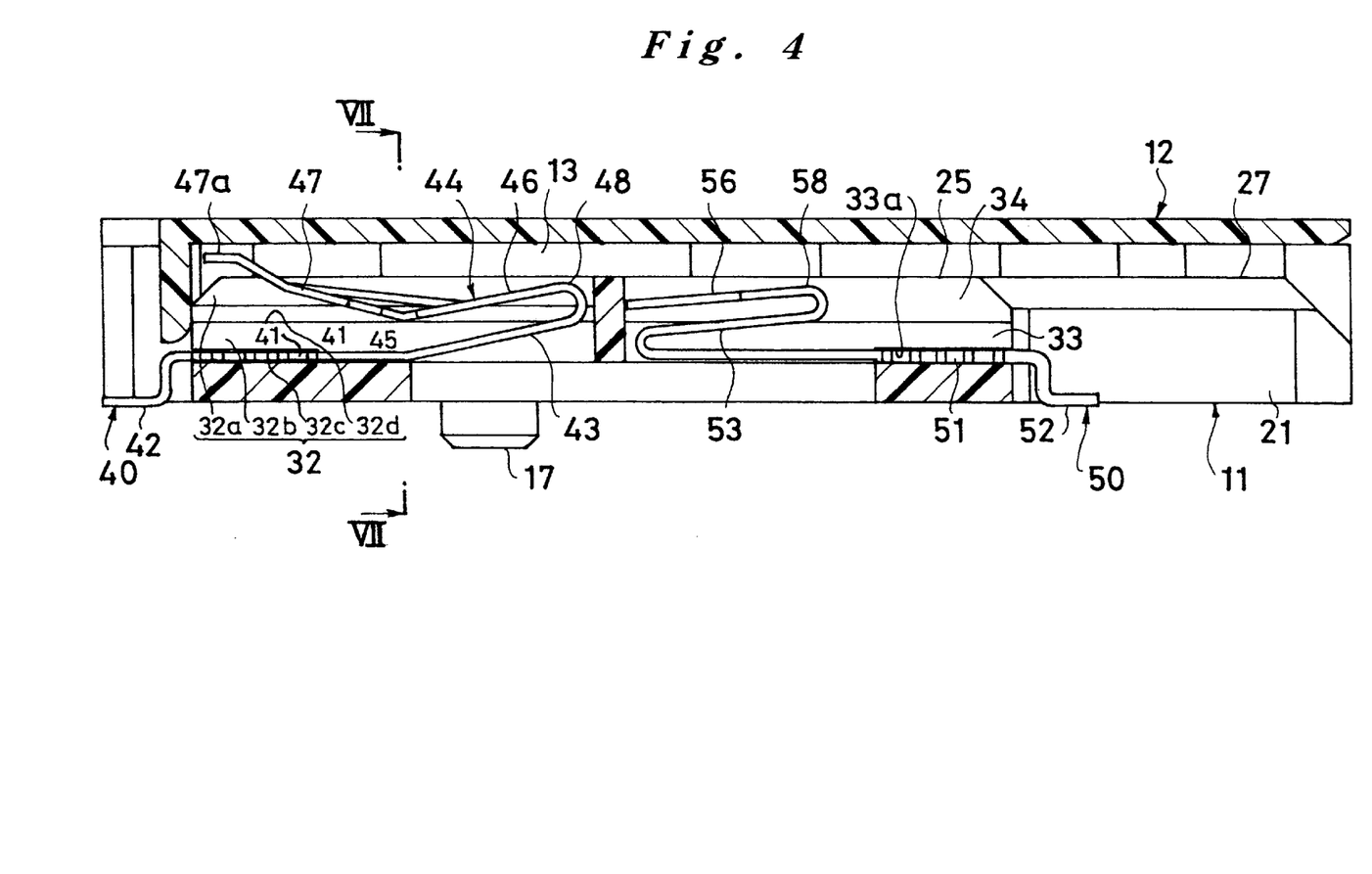
FIG. 4 is a sectional view of the IC card connector, taken along line IV—IV in FIG. 2.
Figure 7:
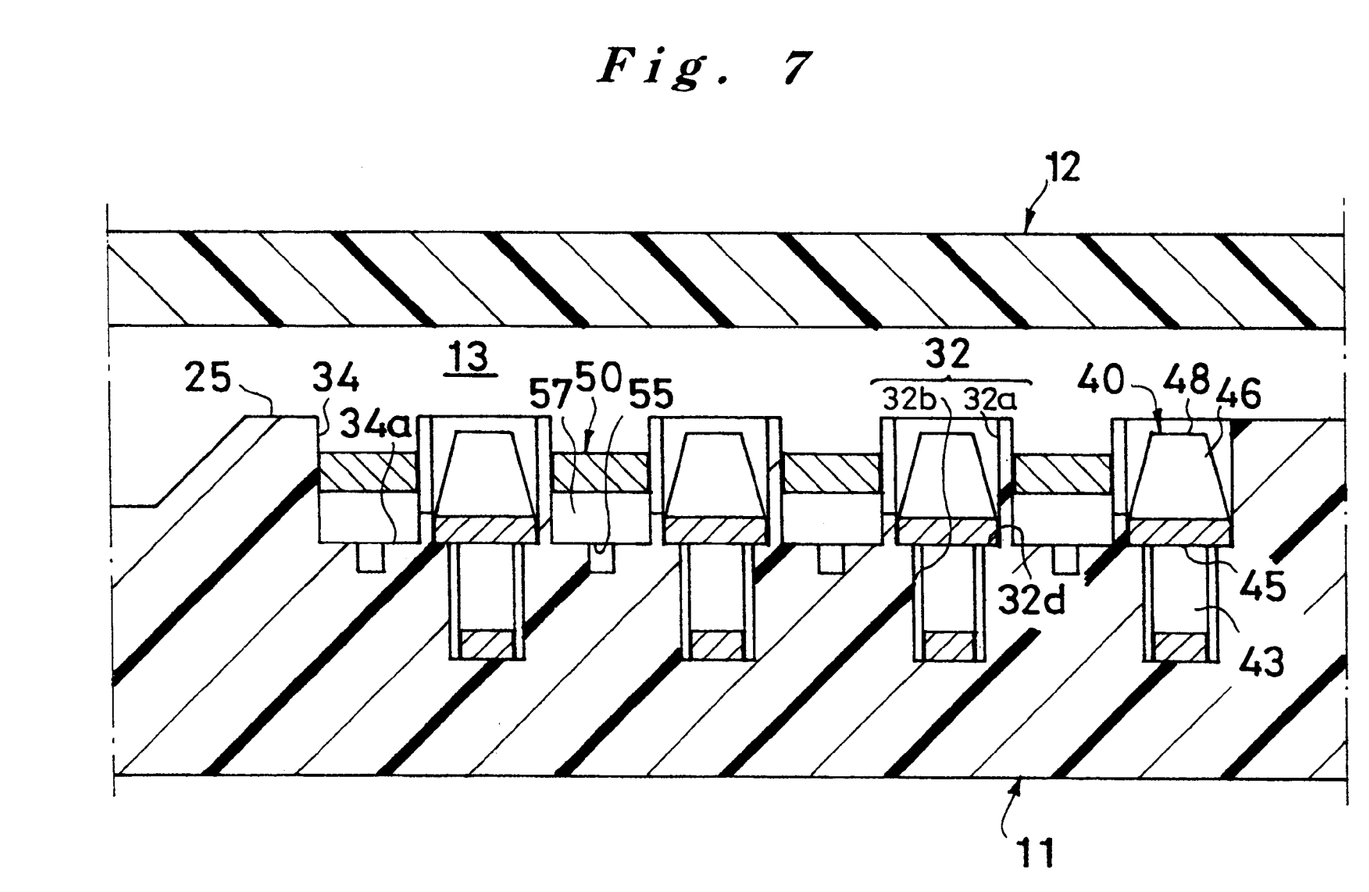
FIG. 7 is a sectional view of the IC card connector, taken along line VII—VII in FIG. 4.

As shown in FIGS. 4 and 7, each of the first grooves 32 actually comprises an upper groove 32a and a lower groove 32b, which is positioned directly below the upper groove 32a and has a width narrower than that of the upper groove 32a. In addition, a first contact mounting groove 32c is provided with a width narrower than that of the lower groove 32b, at the lower part of each lower groove 32b (only in the part near the rear end of the bottom wall). As shown in FIG. 4, each of the second grooves 33 has the same depth as the lower groove 32b of each first groove 32, and a second contact mounting groove 33a is provided with a width wider than that of each second groove 33 (refer to FIG. 3), at the lower part of each second groove 33 (only in the part near the front end of the bottom wall). Also, each of the third grooves 34 has the same depth as each of the upper grooves 32a of the first grooves 32.

As shown in FIG. 4, each first contact 40 comprises an anchoring portion 41, a lead portion 42, a connect portion 43, and a V-shaped arm portion 44. The anchoring portion 41 is press-fit into the first contact mounting groove 32c to anchor the first contact 40. The lead portion 42 extends from the anchoring portion 41 downward and rearward to the rear of the bottom wall 21. The connect portion 43 extends obliquely from the anchoring portion 41 forward and upward and supports the V-shaped arm portion 44. The V-shaped arm portion 44 further includes a first arm portion 46, which extends obliquely forward and upward from a pivot portion 45, i.e., the part located at the bottom of the V, and a second arm portion 47, which extends obliquely rearward and upward from the pivot portion 45. A contact portion 48 which is provided at the front end of the first arm portion 46 is continuous from the connect portion 43, and the second arm portion 47 is located above the anchoring portion 41. As shown in FIG. 7, the anchoring portion 41 and the lower part of the connect portion 43 are placed in the lower groove 32b while the upper part of the connect portion 43 and the V-shaped arm portion 44 are placed in the upper groove 32a, respectively. In this condition, the upper part of each first contact 40 above the anchoring portion 41 is capable of bending elastically. Because the width of the pivot portion 45 is narrower than the width of the upper groove 32a but wider than that of the lower groove 32b, the pivot portion 45 meets the bottom surface 32d of the upper groove 32a, and the further downward movement of the pivot portion 45 is restricted. The contact portion 48 is positioned below the card receiving compartments 13 while a push portion 47a, which is the horizontal rear end portion of the second arm portion 47, is positioned in the card receiving compartments 13.

Figure 5:
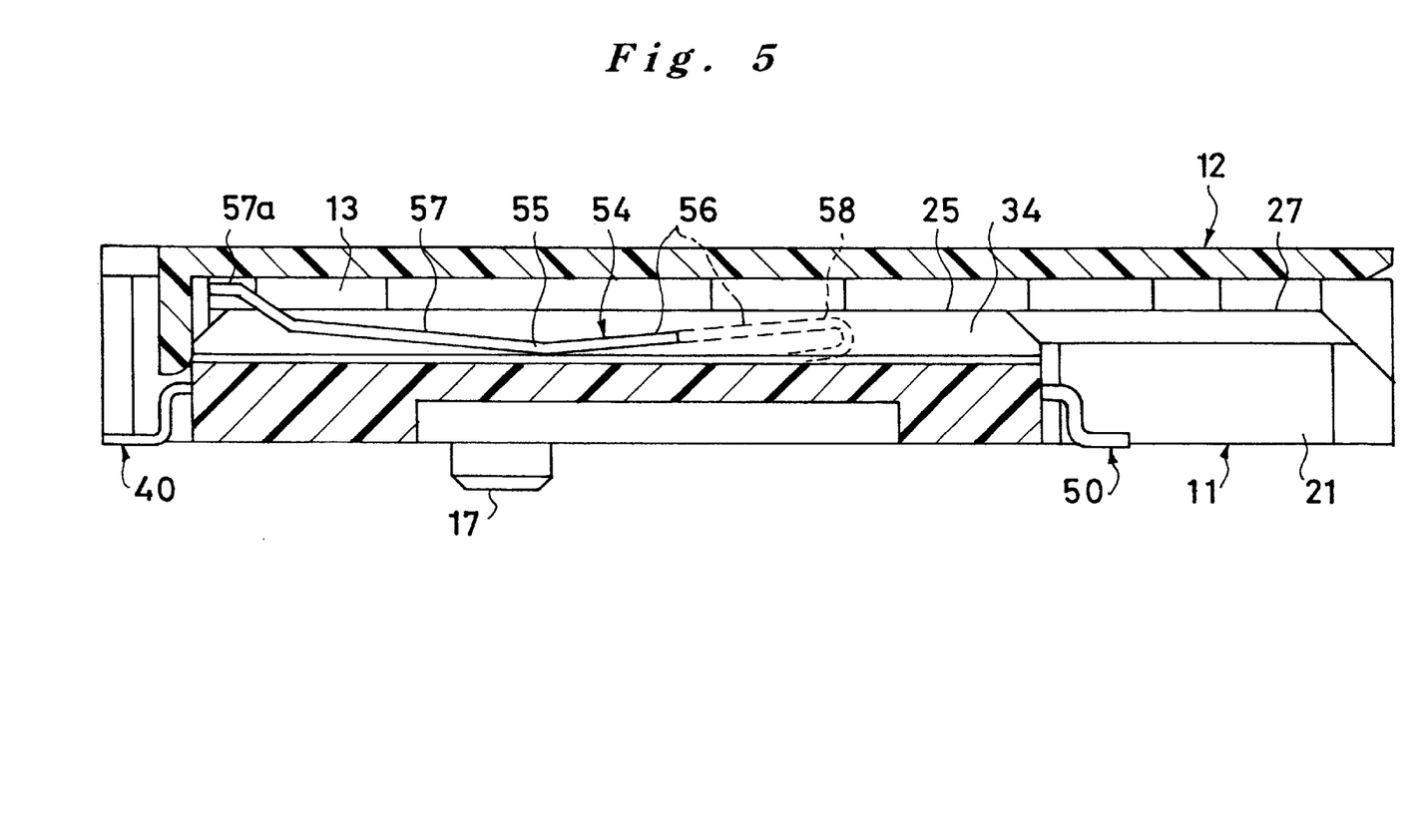
FIG. 5 is a sectional view of the IC card connector, taken along line V—V in FIG. 2.

As shown in FIGS. 4 and 5, each second contact 50 comprises an anchoring portion 51, a lead portion 52, a connect portion 53, and a V-shaped arm portion 54. The anchoring portion 51 is press-fit into the second contact mounting groove 33a to anchor the second contact 50. The lead portion 52 extends from the anchoring portion 51 downward and forward to the front of the bottom wall 21. The connect portion 53 extends rearward from the anchoring portion 51 and then bends obliquely forward and upward and supports the V-shaped arm portion 54. The V-shaped arm portion 54 further includes a first arm portion 56, which extends obliquely forward and upward from a pivot portion 55, i.e., the part located at the bottom of the V, and a second arm portion 57, which extends obliquely rearward and upward from the pivot portion 55. A contact portion 58 which is provided at the front end of the first arm portion 56 is continuous from the connect portion 53, and the first arm portion 56 is located rearward with respect to and above the anchoring portion 51. As shown in FIGS. 2 and 3, the part of the first arm portion 56 of the V-shaped arm portion 54, from the contact portion 58 to the pivot portion 55, extends bending upward and rightward (refer to FIG. 2). Therefore, while the anchoring portion 51 and the connect portion 53 of each second contact 50 are placed in the second groove 33, the first arm portion 56 extends spanning from the second groove 33 to the third groove 34, and the pivot portion 55 and the second arm portion 57 are positioned in the third groove 34. In this condition, the upper part of each second contact 50 above the anchoring portion 51 is capable of bending elastically. The pivot portion 55 meets the bottom surface 34a of the third groove 34, so the further downward movement of the pivot portion 55 is restricted. The contact portion 58 is positioned below the card receiving compartment 13 while a push portion 57a, which is the horizontal rear end portion of the second arm portion 57, is positioned in the card receiving compartment 13.

In this construction, while the anchoring portion 51 and the contact portion 58 of each second contact 50 are positioned in front of the anchoring portion 41 and the contact portion 48 of a corresponding first contact 40, the second arm portion 47 of each first contact 40 is positioned in parallel with the second arm portion 57 of a corresponding second contact 50 because the first arm portion 56 of each second contact 50 is bent laterally. Thus, the second arm portions 47 of the first contacts 40 and the second arm portions 57 of the second contacts 50 are positioned interchangeably in the lateral direction. In other words, while the contact portions 48 of the first contacts 40 and the contact portions 58 of the second contacts 50 are aligned in pairs in the longitudinal direction, the push portions 47a of the first contacts 40 and the push portions 57a of the second contacts 50 are aligned in pairs in the lateral direction (refer to FIG. 2).

Figure 6:
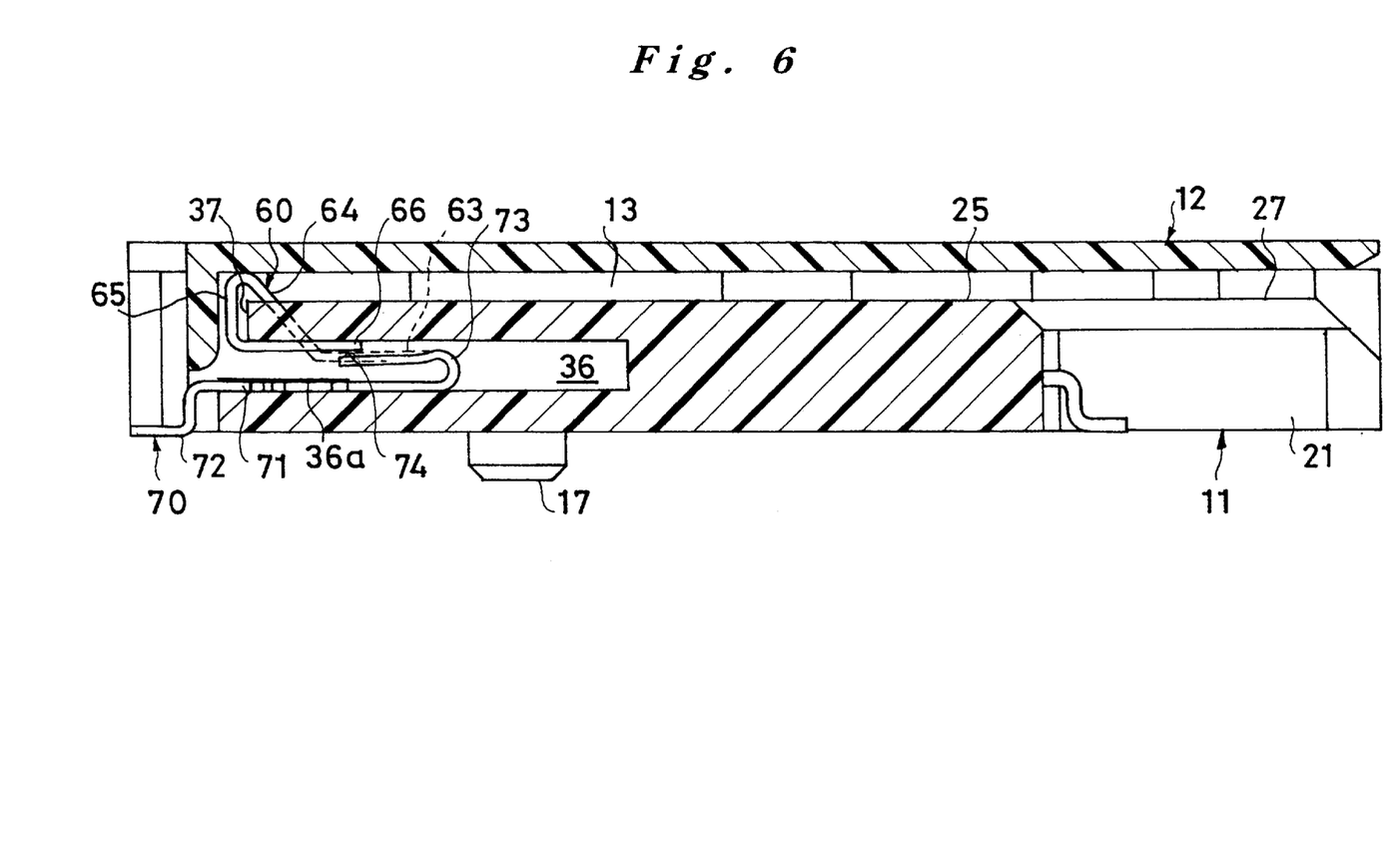
FIG. 6 is a sectional view of the IC card connector, taken along line VI—VI in FIG. 2.
Figure 10:
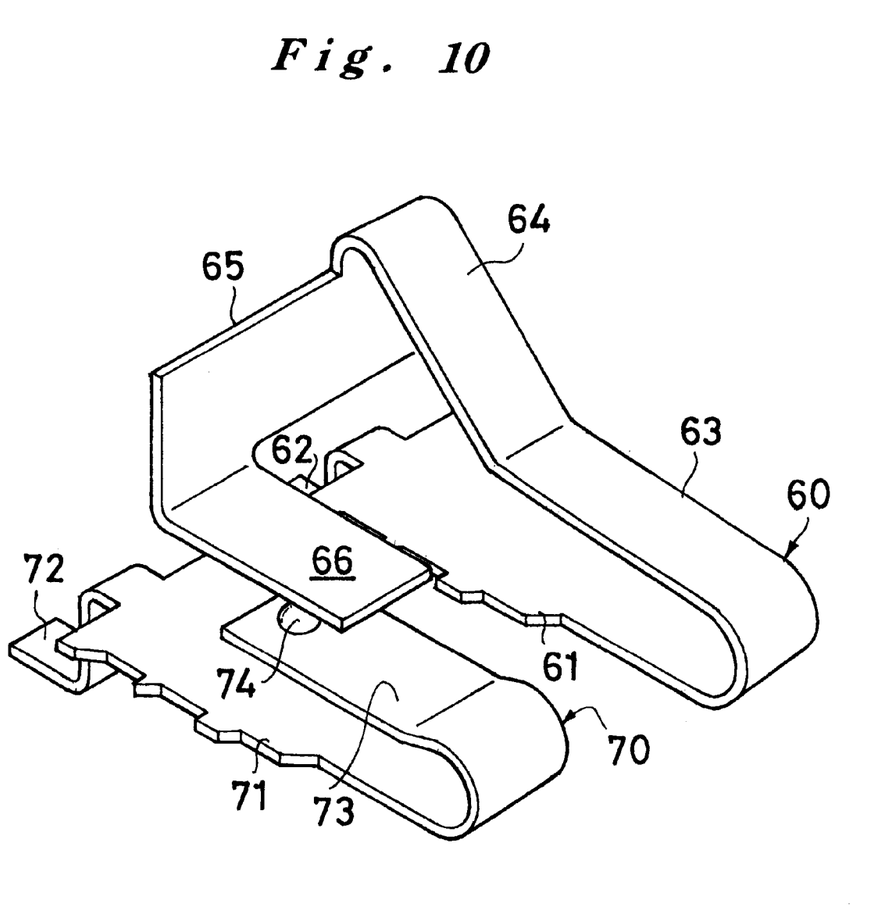
FIG. 10 is a perspective view of first and second switch members.

As shown in FIGS. 2 and 6, the first switch member 60 is placed in the first compartment 35, and it extends also into the second compartment 36. As shown in FIG. 10 (where the main housing 11 is not shown), the first switch member 60 comprises an anchoring portion 61, a lead portion 62, a first arm portion 63, a second arm portion 64, a third arm portion 65, and a contact portion 66. The anchoring portion 61 is press-fit into a first switch member mounting groove 35a which is provided at the lower part of the first compartment 35, to fix the first switch member 60 in the main housing. The lead portion 62 extends from the anchoring portion 61 downward and rearward so as to be positioned at the rear of the bottom wall 21. The first arm portion 63 extends forward and horizontally from the anchoring portion 61, then bends upward in a U turn and extends horizontally rearward. The second arm portion 64 extends obliquely upward and rearward from the rear end of the first arm portion 63, and the third arm portion 65 extends downward and leftward (toward the second switch member 70) from the upper end of this second arm portion 64. The contact portion 66 extends horizontally forward from the lower left end of the third arm portion 65. A cut-out 37 is provided to open the rear parts of the first and second compartments 35 and 36 upward, so the second arm portion 64 protrudes through the cut-out 37 upward into the card receiving compartment 13, so the contact portion 66 is positioned in the second compartment 36.

As shown in FIGS. 2 and 6, the second switch member 70 is placed in the second compartment 36. The second switch member 70 comprises an anchoring portion 71, a lead portion 72, an arm portion 73, and a contact portion 74. The anchoring portion 71 is press-fit into a second switch member mounting groove 36a which is provided at the lower part of the second compartment 36, to fix the second switch member 70 in the main housing. The lead portion 72 extends from the anchoring portion 71 downward and rearward so as to be positioned at the rear of the bottom wall 21. The arm portion 73 extends forward and horizontally from the anchoring portion 71, then bends upward in a U turn and extends horizontally rearward. The contact portion 74 is a convex portion which is formed on the upper surface of the arm portion 73. In the housing, the contact portion 74 of the second switch member 70 is positioned under the contact portion 66 of the first switch member 60.

The connector 1, which is constructed as described above, is positioned on a printed circuit board (not shown) by fitting the positioning pins 16 and 17 of the connector into the holes which are provided on the printed circuit board for positioning. Then, the lead portions 42 and 52 of the first and second contacts 40 and 50 as well as the lead portions 62 and 72 of the first and second switch members 60 and 70 are surface-mounted onto corresponding terminals which are provided on the printed circuit board. Also, the lower parts (also referred to as "fixed parts") of the metal fittings 14 and 15 are surface-mounted onto corresponding pads which are provided on the printed circuit board, to fix the connector (the fixed part 14a of the metal fitting 14 is shown in FIG. 1).

Figure 8A:
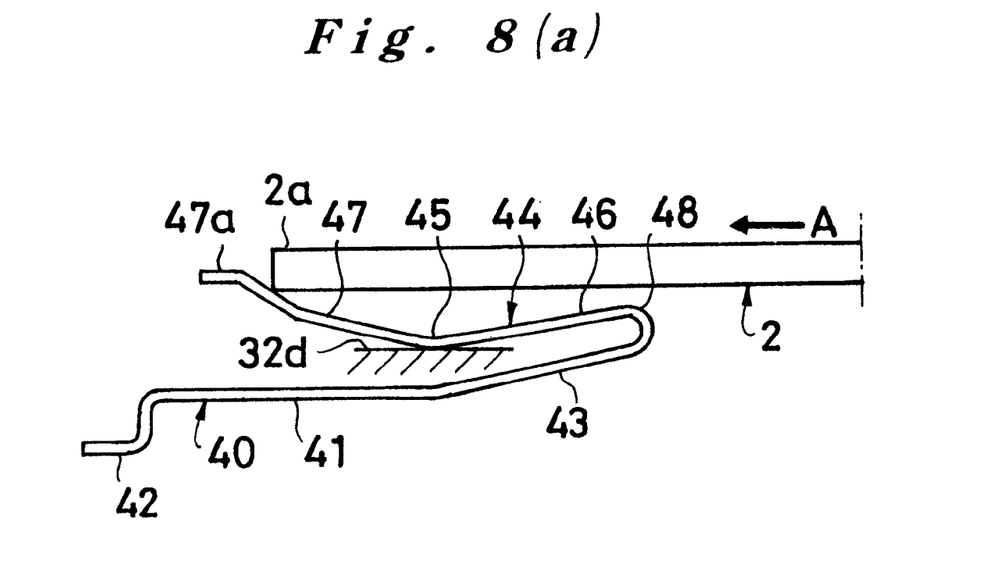
FIGS. 8A and 8B are partial side views, showing the elastic deformation of a first contact, which deformation is caused by the insertion of an IC card, FIG. 8A showing a tip of the IC card meeting a portion of the first contact which is to be pressed downward (this portion is referred to as "push portion") and FIG. 8B showing the first contact being elastically bent and its contact portion being in contact with a flat contact of the IC card.
Figure 8B:
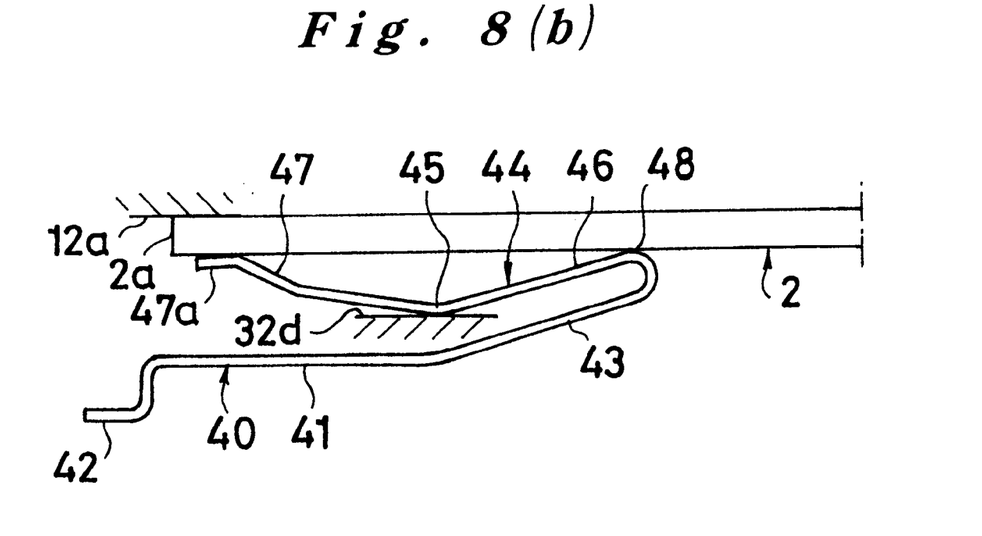
Figure 9A:
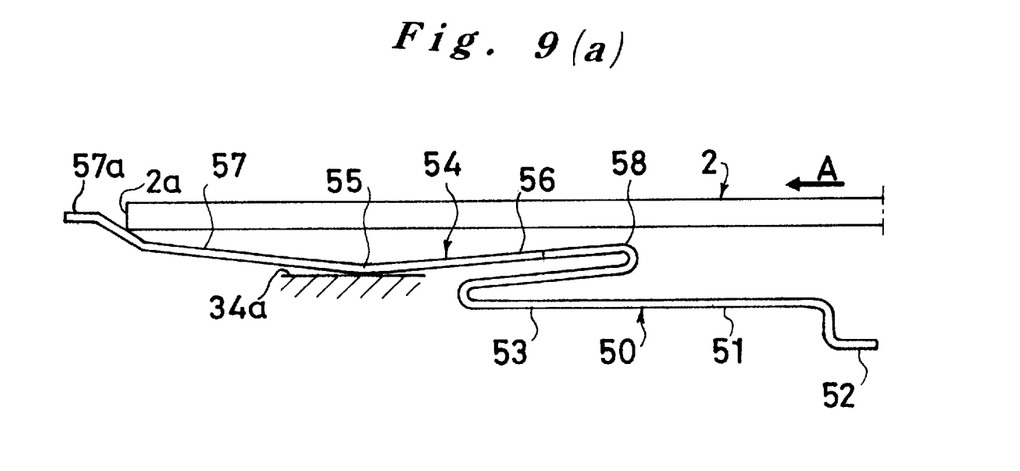
FIGS. 9A and 9B are partial side views, showing the elastic deformation of a second contact, which deformation is caused by the insertion of the IC card, FIG. 9A showing the tip of the IC card meeting a portion of the second contact which is to be pressed downward (this portion is also referred to as "push portion") and FIG. 9B showing the second contact being elastically bent and its contact portion being in contact with a flat contact of the IC card.
Figure 9B:
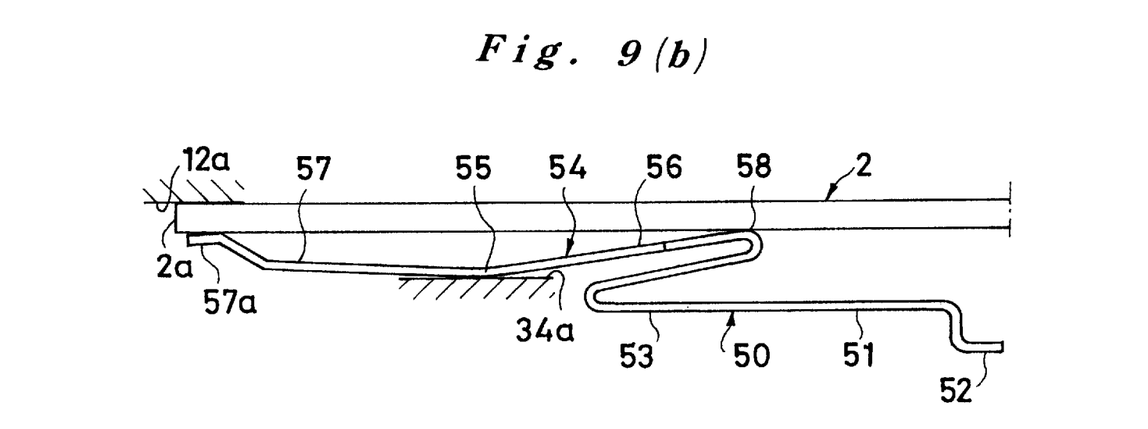

Into this connector 1, which is mounted on the printed circuit board, the IC card 2 is inserted through the slot 13a in the direction indicated by arrow A. During the insertion, the lateral sides of the IC card 2 are guided by the guide grooves 28 and 29 of the connector. The IC card 2 is pushed and inserted into the card receiving compartment 13 smoothly until the tip 2a of the IC card 2 meets the rear wall 22 of the main housing 11. During the insertion, the tip 2a of the IC card 2 hits and lowers (i.e., pushes and presses down) the push portions 47a and 57a of the first and second contacts 40 and 50 in the card receiving room 13 (refer to FIGS. 8A and 9A). As the push portions 47a and 57a are being lowered, the V-shaped arm portions 44 and 54 of the first and second contacts 40 and 50 are rocked around the pivot portions 45 and 55, respectively. As a result, the contact portions 48 and 58 are lifted to come into contact with the flat contacts of the IC card (refer to FIGS. 8B and 9B).

In this construction, the dimensions of the V-shaped arm portions 44 and 54 can be determined appropriately to adjust the timing when the contact portions 48 and 58 of the connector come into contact with the flat contacts of the IC card so as to minimize the distance which the flat contacts travel sliding on the contact portions 48 and 58. In this way, the wear of the contacts can be reduced to prevent occurrence of contact failure. Therefore, it is preferable that the contact portions 48 and 58 of the connector be brought into contact with the flat contacts of the IC card just before the tip 2a of the IC card 2 hits the rear wall 22 of the housing of the connector. It is also preferable that these contact members be slid in contact over a short distance so as to generate a wiping effect between the flat contacts of the IC card and the contact portions of the connector, i.e., an action to wipe out minute particles which may exist on the flat contacts. Furthermore, in this construction, each contact portion 48 or 58 and a corresponding push portion 47a or 57a, which works to lift or lower the contact portion, are provided in a single body as one component, respectively. Therefore, the number of parts used for the assembly of the connector is relatively small, so the production cost of the connector is relatively small.

When the IC card 2 is set in the connector as described above, the first and second contacts 40 and 50, which are experiencing an elastic deformation, have some resiliency. Therefore, the push portions 47a and 57a of the contacts of the connector push the rear end portion 2a of the IC card 2 upward onto the lower surface 12a of the housing cover 12. Thus, the rear end portion 2a of the IC card 2 is sandwiched between the push portions 47a and 57a of the contacts 40 and 50 and the lower surface 12a of the housing cover 12 of the connector (refer to FIGS. 8B and 9B). As a result, the IC card 2 is retained securely in the card receiving compartment 13, so the reliability of electrical connection between the contact portions 48 and 58 of the connector and the flat contacts of the IC card is relatively high. Therefore, there is no need to provide a special or extra component for the purpose of retaining the IC card 2. This is an advantage in cost reduction.

Figure 11A:
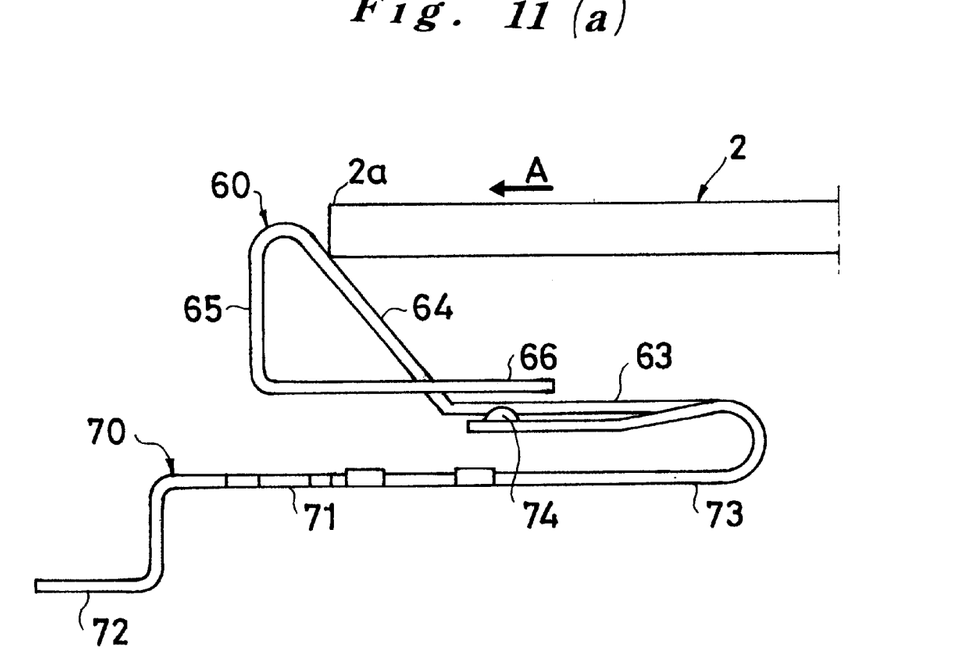
FIGS. 11A and 11B are partial side views, showing the elastic deformation of the first and second switch members, which deformation is caused by the insertion of the IC card, FIG. 11A showing the tip of the IC card meeting the first switch member and FIG. 11B showing the first switch member being elastically bent and its contact portion being in contact with the contact portion of the second switch member.
Figure 11B:
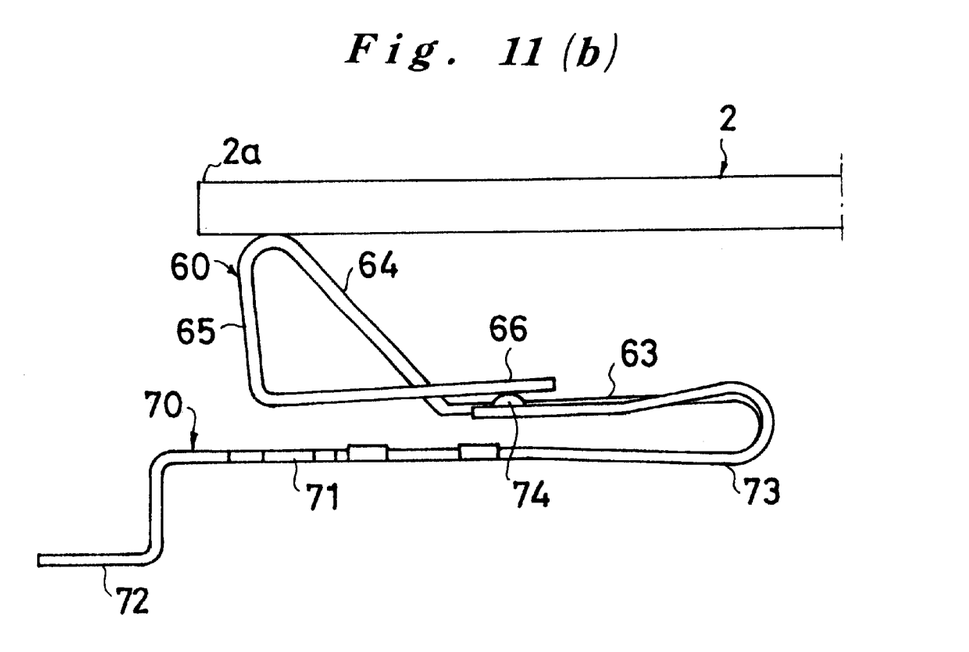

Also, when the IC card 2 is inserted into the card receiving room 13, the tip 2a of the IC card 2 hits and lowers the second arm portion 64 of the first switch member 60 (refer to FIG. 11A). As a result, the first switch member 60 experiences an elastic deformation, and the contact portion 66 is shifted downward and brought into contact with the contact portion 74 of the second switch member 70. Thus, the first switch member 60 and the second switch member 70 are connected electrically, and by this switching on, the insertion of the IC card 2 into the card receiving compartment 13 is detectable. In the construction of the connector, the contact portions 66 and 74 of the first and second switch members 60 and 70 are incorporated in the main housing 11, so these contact portions are dust proof. Therefore, possibility of contact failure is relatively low. When the IC card 2 is removed from the card receiving compartment 13, the contacts 40 and 50 and the switch members 60 and 70 of the connector are released form the forced elastic deformation and return to the original condition, which is the exact condition before the insertion of the IC card 2. In this condition, the contact portions 48 and 58 of the contacts of the connector are positioned below the card receiving compartment 13, and the push portions 47a and 57a of the contacts are positioned in the card receiving compartment 13. Also, the contact portions 66 and 74 of the first and second switch members 60 and 70 are separated.

An embodiment of IC card connector according to the present invention has been described. It is presented only as an example, and the present invention is not limited to the above embodiment. Many modifications can be made. For example, in the above embodiment, the connect portion 43 or 53 of each contact 40 or 50 is connected continuously to the contact portion 48 or 58. However, it is not necessary to extend the connect portion continuously to the contact portion 48 or 58. As long as the condition or arrangement in which the downward movement of the pivot portion 45 or 55 is restricted, the contact portion 48 or 58 is positioned below the card receiving compartment 13, and the push portion 47a or 57a is positioned in the card receiving compartment 13 is satisfied, the connect portion may be connected to any portion of the V-shaped arm portion 44 or 54. However, the design used for the contacts 40 and 50 of the above embodiment, in which the connect portion of each contact is continuous to the contact portion, is advantageous in manufacturing because the whole contacts can be formed from one sheet of plate. Furthermore, in the above IC card connector 1, two types of contacts, i.e., first and second contacts 40 and 50, are used. However, an IC card connector can be constructed with only one type of contacts, either the first contacts 40 or the second contacts 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. PH10-336727 filed on Nov. 27, 1998 which is incorporated herein by reference.

What is claimed is:

1. An IC card connector comprising:
    a plate-like connector housing having a card receiving compartment, into which an IC card is inserted through a card insertion slot provided at a front end of said connector housing, and
    a plurality of contacts, which are incorporated in said connector housing and are brought into contact with flat contacts provided on a lower surface of said IC card for information interchange;
    wherein:
        each of said contacts comprises an anchoring portion, a connect portion, and a V-shaped arm portion, said anchoring portion being fixed in said connector housing at a position below said card receiving compartment, said connect portion being continuous from said anchoring portion, said V-shaped arm portion being elastically connected to said connect portion and including a first arm portion which extends obliquely forward and upward from a pivot portion located centrally in said V-shaped arm portion and a second arm portion which extends obliquely rearward and upward from said pivot portion;
        each of said contacts is mounted in said connector housing in such a way that said connector housing engages with said pivot portion of said V-shaped arm portion so as to restrict downward movement of said pivot portion, a contact portion which is provided at an end of said first arm portion is positioned below said card receiving compartment, and a push portion which is provided at an end of said second arm portion is positioned in said card receiving compartment; and
        when said IC card is inserted through said card insertion slot, a tip of said IC card hits and pushes said push portions of said contacts downward, thereby rocking said V-shaped arm portions of said contacts around said pivot portions such that said contact portions of said contacts are lifted upward and brought into contact with said flat contacts of said IC card.

2. The IC card connector as set forth in claim 1, wherein said connect portion of each of said contacts extends from said anchoring portion obliquely forward and upward continuously to said contact portion.

3. The IC card connector as set forth in claim 1, wherein said connect portion of each of said contacts first extends from said anchoring portion rearward and then makes a U turn and extends obliquely forward and upward continuously to said contact portion.

4. The IC card connector as set forth in claim 1, wherein said contacts further comprise a plurality of first contacts and a plurality of second contacts, said connect portion of each of said first contacts extending from said anchoring portion obliquely forward and upward continuously to said contact portion, said connect portion of each of said second contacts extending from said anchoring portion rearward and then making a U turn and then extending obliquely forward and upward continuously to said contact portion; and
    when said anchoring portion and said contact portion of each second contact are placed in front of said anchoring portion and said contact portion of a corresponding first contact, because said first arm portion of each second contact is bent laterally, said second arm portions of said first contacts and said second arm portions of said second contacts are positioned laterally interchangeably in parallel with each other in said connector housing.

5. The IC card connector as set forth in any of the above claims, claim 1 through 4, wherein said contact portions come into contact with said flat contacts of said IC card just before said IC card is completely inserted in said card receiving compartment.

6. The IC card connector as set forth in any of the above claims, claim 1 through 4, wherein when said IC card is set in said card receiving compartment, said tip of said IC card is sandwiched between said push portions of said contacts and said connector housing.

7. The IC card connector as set forth in claim 5, wherein when said IC card is set in said card receiving compartment, said tip of said IC card is sandwiched between said push portions of said contacts and said connector housing.

* * * * *